(12) United States Patent
Ransbarger et al.

(10) Patent No.: US 7,422,543 B2
(45) Date of Patent: Sep. 9, 2008

(54) ROTATION COUPLING EMPLOYING TORQUE CONVERTER AND SYNCHRONIZATION MOTOR

(75) Inventors: Weldon L. Ransbarger, Houston, TX (US); Bobby D. Martinez, Missouri City, TX (US)

(73) Assignee: ConocoPhillips Company, Houston, TX (US)

( * ) Notice: Subject to any disclaimer, the term of this patent is extended or adjusted under 35 U.S.C. 154(b) by 225 days.

(21) Appl. No.: 11/226,741

(22) Filed: Sep. 14, 2005

(65) Prior Publication Data

US 2007/0060442 A1 Mar. 15, 2007

(51) Int. Cl.
*F02C 7/36* (2006.01)
*F16H 61/48* (2006.01)
*F16D 33/00* (2006.01)

(52) U.S. Cl. .............................. 477/53; 477/30; 60/330; 60/718

(58) Field of Classification Search .................. 477/30, 477/53; 60/330, 361, 711, 718
See application file for complete search history.

(56) References Cited

U.S. PATENT DOCUMENTS

| | | | | |
|---|---|---|---|---|
| 2,868,438 A | * | 1/1959 | Gammon et al. | 417/390 |
| 3,764,815 A | | 10/1973 | Habock et al. | |
| 4,305,710 A | * | 12/1981 | Schneider | 440/75 |
| 6,463,740 B1 | | 10/2002 | Schmidt et al. | |
| 6,640,586 B1 | | 11/2003 | Baudat et al. | |
| 6,691,531 B1 | | 2/2004 | Martinez et al. | |
| 6,724,099 B2 | | 4/2004 | Klaar | |
| 6,838,779 B1 | | 1/2005 | Kandil et al. | |
| 6,979,280 B2 | * | 12/2005 | Oshima et al. | 477/186 |

FOREIGN PATENT DOCUMENTS

EP 0734113 8/2002
JP 2000179677 A * 6/2000

* cited by examiner

*Primary Examiner*—Tisha D Lewis

(57) ABSTRACT

A system employing a torque converter and a synchronizing motor to start up a large rotational driver/load combination. The torque converter is employed to increase the rotational speed of the load to the maximum speed permitted by the torque converter. The synchronizing motor is then employed to further increase the rotational speed of the load to substantially match the rotational speed of the driver.

30 Claims, 1 Drawing Sheet

ROTATION COUPLING EMPLOYING TORQUE CONVERTER AND SYNCHRONIZATION MOTOR

BACKGROUND OF THE INVENTION

1. Field of the Invention

Figure 1:
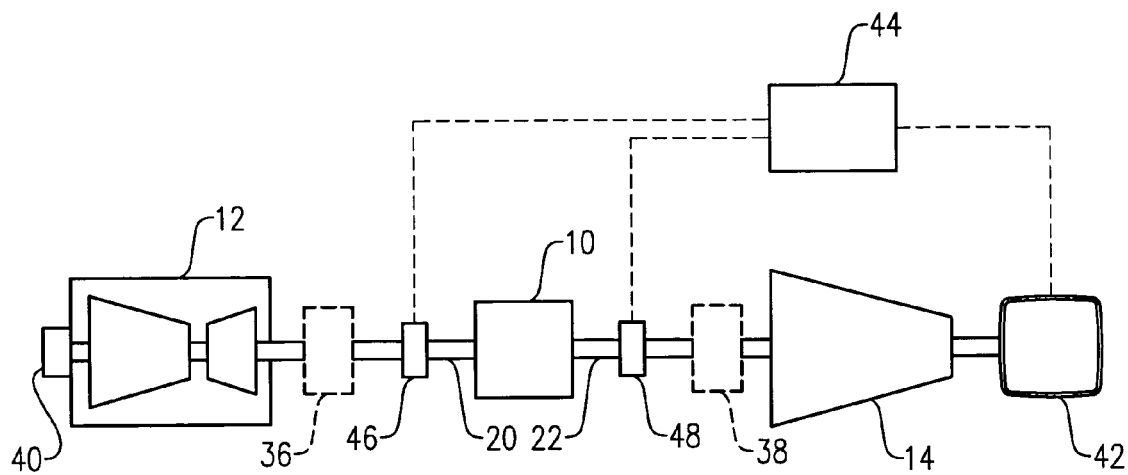

The present invention relates generally to systems from transmitting torque from a rotating driver to a rotational load. In another aspect, the invention concerns a method and apparatus for starting up a large compressor driven by a gas turbine.

2. Description of the Prior Art

Rotating drivers powering rotational loads are employed in many applications. For example, facilities that produce electrical power frequently employ a gas turbine to power an electrical generator. Further, liquified natural gas (LNG) facilities typically employ at least one gas turbine or electrical motor to power a refrigerant compressor.

When large, high-speed rotational loads are employed, it may be impossible to start up the associated driver while it is coupled to the load. In such a scenario, the most common solution is to decouple the load from the driver during start-up of the driver, and then somehow couple the load to the driver once the driver has reach normal operating speed. Obviously, a non-rotating load can not simply be abruptly mechanically locked to the driver while the driver is rotating at full speed.

In the past, large "starter" motors have been employed during start-up of large rotational driver/load combinations. The starter motors are used to bring the load up to operating speed so that it can be mechanically coupled to the driver. However, starter motors that are powerful enough to increase the rotational speed of the load from zero to full operating speed are very expensive.

OBJECTS AND SUMMARY OF THE INVENTION

It is, therefore, an object of the present invention to provide an improved system for starting up large rotational driver/load combinations without requiring a large starter motor that is capable of accelerating the load from static conditions to full operating speed.

Accordingly, one aspect of the present invention concerns a method comprising the following steps: (a) using a torque converter to cause a drive element to rotate a load element; and (b) using a motor to substantially synchronize the rotational speeds of the drive and load elements.

Another aspect of the invention concerns a method of starting a compressor powered by a gas turbine. The method comprises the following steps: (a) using the gas turbine to rotate a drive shaft without rotating a load shaft that drives the compressor; (b) subsequent to step (a), using a torque converter to transmit torque from the drive shaft to the load shaft, thereby causing rotation of the load shaft; (c) simultaneously with step (b), using an electric motor to increase the rotational speed of the load shaft until the rotational speeds of the drive and load shafts are substantially synchronized; and (d) while the rotational speeds of the drive and load shafts are substantially synchronized, mechanically locking the drive and load shafts to one another.

Still another aspect of the invention concerns an apparatus comprising a rotational driver, a rotational load, a torque converter, and a motor. The driver is operable to rotate a drive element, and the load is rotatable by a load element. The torque converter is operable to transmit torque from the drive element to the load element. The motor is drivingly connected to the load element and is operable to increase the speed of rotation of the load element.

BRIEF DESCRIPTION OF THE DRAWING FIGURES

Figure 2:
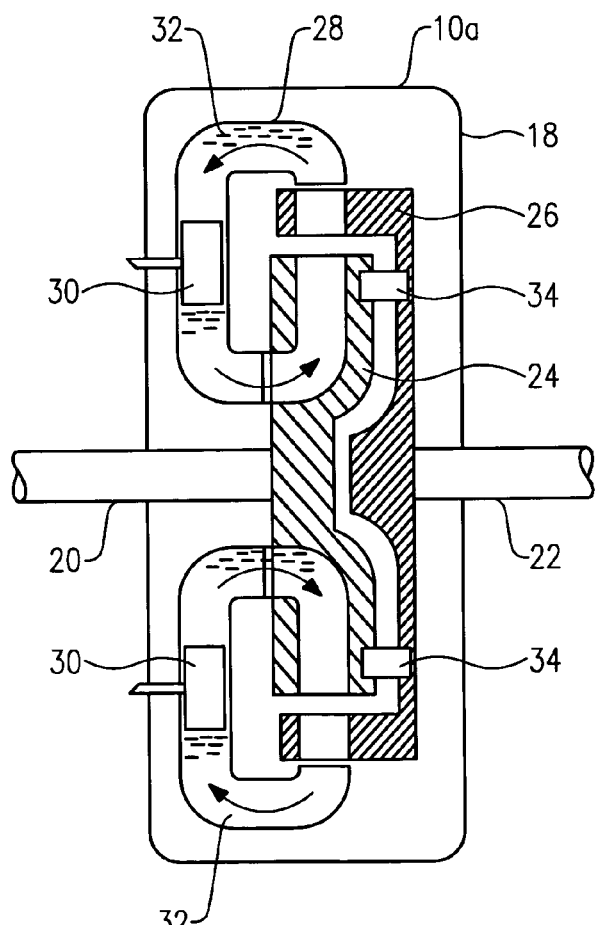

A preferred embodiment of the present invention is described in detail below with reference to the attached drawing figures, wherein:

FIG. 1 is a schematic representation of a rotational driver, rotational load, and a system for transmitting torque from the driver to the load; and FIG. 2 is a sectional view illustrating in greater detail the internal components of a torque converter that can be employed in the torque-transmitting system shown in FIG. 1.

DETAILED DESCRIPTION OF THE PREFERRED EMBODIMENT

Referring initially to FIG. 1, a system is illustrated that employs a torque converter 10 to transmit torque from a rotational driver 12 to a rotational load 14.

Rotational driver 12 can be any device(s) capable of producing rotational mechanical energy. For example, rotational driver 12 can be an electric motor, a hydraulic turbine, or a gas turbine. Preferably, rotational driver 12 is a gas turbine. The present invention is particularly well suited for applications where rotational driver 12 is capable of producing vary large amounts of power at high rotational speeds. Preferably, rotational driver 12 is capable of providing at least about 2,000 horsepower, more preferably at least about 10,000 horsepower, and most preferably in the range of from 20,000 to 200,000 horsepower. Preferably, rotational driver 12 operates at a rotational speed of at least about 1,000 revolutions per minute (rpm), more preferably at least about 2,000 rpm, and most preferably in the range of from 2,500 to 8,000 rpm.

Rotational load 14 can be any device(s) requiring a power input in the form of rotational mechanical energy. For example, rotational load 14 can be an electric generator, a pump, a reciprocating compressor, an axial compressor, or a centrifugal compressor. Preferably, rotational load 14 is a centrifugal compressor. In one embodiment, the amount of power and the rotational speed required to drive rotational load 14 is the same as set forth above with reference to the power and speed output of rotational driver 12.

Torque converter 10 can be any device which can be adjusted to change the amount of torque transmitted from a rotating drive element to a rotatable load element. As used herein, the term "torque converter" denotes a device that transmits torque from a rotating drive element to a rotatable load element but exhibits some rotational slippage. The rotational slippage associated with a torque converter does not permit the rotational speed of the load element to be exactly synchronized with the rotational speed of the drive element when the load element is driven only by the drive element, the drive element rotates at a substantially constant speed, and the load and drive elements are not mechanically locked to one another.

Various types of torque converters are known in the art. In one embodiment of the present invention, torque converter 10 is a fluid coupling. As used herein, the term "fluid coupling" denotes a torque converter that employs a working fluid to transmit torque from a drive element to a load element. FIG. 2 illustrates a fluid coupling 10a that is suitable for use as torque converter 10 in the system of FIG. 1.

Fluid coupling 10a, illustrated in FIG. 2, includes a housing 18, a drive element 20, a load element 22, an impeller 24, a turbine wheel 26, a fluid reservoir 28, and guide vanes 30. Drive element 20 extends through an input opening in housing 18, while load element 22 extends through an output opening in housing 18. Impeller 24, turbine wheel 26, and fluid reservoir 28 are all disposed in housing 18. Impeller 24 is rigidly coupled to one end of drive element 20, while turbine wheel 26 is rigidly coupled to one end of load element 22. Fluid coupling 10a can be operated in a "free-wheel mode" or a "torque-transmitting mode."

When operating in the "torque-transmitting mode," a working fluid 32 is present in fluid reservoir 28 of fluid coupling 10a and is used to transmit torque from drive element 20 to load element 22 via impeller 24 and turbine wheel 26. When rotated by drive element 20, impeller 24 operates as a centrifugal pump to cause the circulation of working fluid 32 in reservoir 28. This circulation of working fluid 32 in reservoir 28 drives the rotation of turbine wheel 26, thereby rotating load element 22. Thus, when operating in the torque-transmitting mode, fluid coupling 10a takes rotational mechanical energy from drive element 20, transforms the rotational mechanical energy into hydraulic energy using impeller 24, and transforms the hydraulic energy into rotational mechanical energy using turbine wheel 26, thereby causing rotation of load element 22. The position of guide vanes 30 can be adjusted to vary the amount of torque transmitted from drive element 20 to load element 22.

In order to operate in the "free-wheel mode," working fluid 32 is substantially evacuated from fluid reservoir 28. When working fluid 32 is removed from fluid reservoir 28, little or no torque is transmitted from drive element 20 to load element 22. Thus, in the free-wheel mode, drive element 20 and impeller 24 rotate freely within housing 18, without causing rotation of turbine wheel 26 and load element 22.

Fluid coupling 10a can also be operated in a "locked mode." When operating in the "locked mode," a lock-up mechanism 34 is employed to mechanically couple drive element 20 to load element 22. In the embodiment illustrated in FIG. 2, lock-up mechanism 34 is shiftable between a locked position and an unlocked position. When in the unlocked position, lock-up mechanism 34 is disengaged from impeller 24 and/or turbine wheel 26, so that fluid coupling 10a can be operated in either the free-wheel mode or the torque-transmitting mode. When in the locked position, illustrated in FIG. 2, lock-up mechanism 34 mechanically couples impeller 24 and turbine wheel 26 to one another so that drive element 20 and load element 22 must rotate at exactly the same speed. As used herein, the terms "mechanical lock," "mechanical locking device," and "lock-up mechanism" shall denote devices that transmit torque from a rotating drive element to a rotatable load element without permitting rotational slippage therebetween.

Referring again to FIG. 1, rotational driver 12 is operable to directly or indirectly rotate drive element 20. When operating in the free-wheel mode, torque converter 10 allows rotational driver 12 to rotate without rotating load element 22 and rotational load 14. When operating in the torque-transmitting mode, torque converter 10 transmits torque from drive element 20 to load element 22, so that rotation of drive element 20 causes rotation of load element 22, and rotation of load element 22 directly or indirectly causes rotation of rotational load 14. An optional gearbox 36 can be coupled between rotational driver 12 and drive element 20 to vary the rotational speed of drive element 20 relative to rotational driver 12. Further, an optional gear box 38 can be coupled between load element 22 and rotational load 14 to vary the rotational speed of rotational load 14 relative to load element 22.

FIG. 1 also illustrates that a conventional starting device 40 can be coupled to rotational driver 12 to assist in starting-up rotational driver 12. In addition, a motor 42 is coupled to rotational load 14 to assist in rotating rotational load 14 during start-up. As discussed above, certain prior art applications employed large electric motors to rotate the load during start-up. The operation of motor 42 in conjunction with torque converter 10, as described in detail below, allows motor 42 to be substantially smaller than conventional electric motors employed to start-up large rotational loads. Preferably, motor 42 has a power rating that is less than about 25 percent of the power rating of rotational driver 12 at design operating conditions of rotational driver 12. More preferably, motor 42 has a power rating that is less than about 15 percent of the power rating of rotational driver 12 at design operating conditions of rotational driver 12. Most preferably, motor 42 has a power rating that is in the range of from 1 to 10 percent of the power rating of rotational driver 12 at design operating conditions of rotational driver 12.

Motor 42 is preferably equipped with a variable frequency drive system that allows the rotational speed of motor 42 to be adjusted so that the rotational speed of load 14 and load element 22 can be increase or decreased. In the embodiment of FIG. 1, motor 42 is illustrated as being directly coupled to rotational load 14. It should be understood, however, that motor 42 can be directly or indirectly coupled to rotational load 14 and/or load element 22 in any manner that permits motor 42 to increase the rotational speed of load 14 and load element 22.

A control system 44 is preferably employed to adjust the rotational speed of motor 42. In one embodiment, control system 44 is simply a manually-controlled device that can be adjusted by an operator of the system. In another embodiment, control system 44 is an automatic control system that receives input signals from a drive speed sensor 46 and a load speed sensor 48 and automatically generates an output signal that adjusts motor 42 to the desired rotational speed based on the input signals. Speed sensors 46 and 48 can be any device capable of directly or indirectly measuring the rotational speed of drive element 20 and load element 22, respectively. In the embodiment illustrated in FIG. 1, drive speed sensor 46 is directly coupled to drive element 20, and load speed sensor 48 is directly coupled to load element 22. It should be understood, however, that speed sensors 46 and 48 can be operably coupled to any rotating component of the system, so long as the speed of drive element 20 and load element 22 can be determined from the output of speed sensors 46 and 48. When control system 44 is manually controlled, the output of speed sensors 46 and 48 may simply be a visual indicator (e.g., dials or digital readouts) of the rotational speeds of drive element 20 and load element 22. In such a manually-controlled scenario, the operator of control system 44 can adjust the speed of motor 42 based on the visual speed indication provided by speed sensors 46 and 48.

In operation, the system illustrated in FIG. 1 can be used to start-up and run rotational driver 12 and rotational load 14 at design capacity. When the system illustrated in FIG. 1 is transitioned from a static condition (where neither driver 12 nor load 14 are rotating) to a full operating condition (where driver 12 and load 14 are operating at their design capacity), the system is generally transitioned sequentially through the following four modes of operation: (1) a "driver-only mode;" (2) a "torque transition mode;" (3) a "synchronizing mode;" and (4) a "mechanically-locked mode."

In the "driver-only mode," the rotational speed of driver 12 is increased from at or near zero rpm to its full operating speed, while the rotational speed of load 14 is maintained at or near zero. During the driver-only mode, torque converter 10 operates in a free-wheel mode so that little or no torque is transmitted from drive element 20 to load element 22. During the driver-only mode, the rotational speed of drive element 20 is increased from at or near zero to an operational drive element speed. Preferably, the operational drive element speed is at least about 1,000 rpm, more preferably at least about 2,000 rpm, and most preferably in the range of from 2,500 to 8,000 rpm. When fluid coupling 10a (FIG. 2) is employed as torque converter 10 (FIG. 1), fluid reservoir 28 of fluid coupling 10a is substantially devoid of working fluid 32 during the driver-only mode. After rotational driver 12 reaches its full operating speed, the system illustrated in FIG. 1 can be shifted from the driver-only mode to the torque transition mode.

In the "torque transition mode," the rotational speed of driver 12 and drive element 20 are maintained at approximately full operating speed and torque converter 10 is employed to transmit torque from drive element 20 to load element 22, thereby increasing the rotational speed of load 14 from at or near zero to a rotational speed approaching its full operating speed. During the torque transition mode, the rotational speed of load element 22 is increased from at or near zero to a maximum transition load element speed. Due to rotational slippage inherent in torque converter 10, during the torque transition mode, the maximum rotational speed of load element 22 is less than the maximum rotational speed of drive element 20. Typically, the rotational speed of load element 22 is at least about 5 rpm less than the rotational speed of drive element 20 during the torque transition mode. More typically, the rotational speed of load element 22 is at least 20 rpm less than the rotational speed of drive element 20 during the torque transition mode. However, it is preferred for the rotational slippage associated with torque converter 10 during the torque transition mode to be minimized so that the rotational speed of load element 22 is within about 20 percent of the rotational speed of drive element 20, more preferably the rotational speed of load element 22 is within 10 percent of the rotational speed of drive element 20. When fluid coupling 10a (FIG. 2) is employed as torque converter 10 (FIG. 1), fluid reservoir 28 of fluid coupling 10a is filled with working fluid 32 during the torque transition mode, so that fluid coupling 10a operates in a torque-transmitting mode during the torque transition mode. Once load element 22 has reached its maximum rotational speed during the torque transition mode, the system illustrated in FIG. 1 is shifted to the synchronizing mode.

During the "synchronizing mode," the rotational speed of driver 12 and drive element 20 are maintained at approximately full operating speed and motor 42 is employed to further increase the rotational speed of load element 22 so that the rotational speed of load element 22 is substantially synchronized with the full operating speed of drive element 20. Thus, during the synchronizing mode, motor 42 "makes up" for the rotational slippage of torque converter 10 to thereby synchronize the rotational speeds of drive element 20 and load element 22. As discussed above, control system 44 can be used in conjunction with drive speed sensor 46 and load speed sensor 48 to adjust the speed of motor 42 in a manner that synchronizes the rotational speeds of load element 22 and drive element 20. During the synchronizing mode, it is preferred for the rotational speed of load element 22 to be increased by at least 5 rpm, more preferably at least 20 rpm. When the rotational speed of load element 22 is substantially synchronized with the speed of drive element 20, it is preferred for the rotational speed of load element 22 to be within about 5 percent of the rotational speed of drive element 20, more preferably within about 2 percent of the rotational speed of drive element 20, still more preferably within about 1 percent of the rotational speed of drive element 20, and most preferably within 0.5 percent of the rotation speed of drive element 20. When the rotational speed of load element 22 is substantially synchronized with drive element 20, it is preferred for the rotational speed of load element 22 to be within about 50 rpm of the rotational speed of drive element 20, more preferably within about 20 rpm of the rotational speed of drive element 20, still more preferably within about 5 rpm of the rotational speed of drive element 20, and most preferably within 1 rpm of the rotation speed of drive element 20. It is preferred for the increase in the rotational speed of load element 22 during the synchronizing mode to be less than about 25 percent of the maximum speed of load element 22 prior to synchronization using motor 42, more preferably within about 10 percent of the maximum speed of load element 22 prior to synchronization using motor 42, and most preferably within 5 percent of the maximum speed of load element 22 prior to synchronization using motor 42. After the rotational speeds of load element 22 and drive element 20 have been substantially synchronized, the system illustrated in FIG. 1 can be shifted from the synchronizing mode to the mechanically-locked mode.

In the "mechanically-locked mode," drive element 20 is mechanically coupled to load element 22 so that no rotational slippage occurs therebetween. When fluid coupling 10a (FIG. 2) is employed as torque converter 10 (FIG. 1), the mechanical coupling of drive element 20 to load element 22 is performed by shifting lock-up mechanism 34 from the unlocked to the locked position. It should be understood, however, that a variety of different mechanical locking mechanisms can be employed to mechanically couple drive element 20 to load element 22 once the rotational speeds of drive element 20 and load element 22 have been substantially synchronized.

Once drive element 20 and load element 22 have been mechanically locked to one another, motor 42 can be disengaged. Thereafter, rotational driver 12 and rotational load 14 can be operated at their designed capacities.

In one embodiment of the invention, during the driver-only, torque transition, and synchronizing modes, the power required to rotate load 14 is reduced below the full design requirement. During the mechanically locked mode, the power required to rotate load 14 can then be increased to the full design requirement. This varying of the amount of load aids in start-up of driver 12 and load 14. For example, when load 14 is a compressor, the differential provided by the compressor can be reduced during start-up and then increased to full design capacity after mechanically locking driver 12 and load 14 to one another.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method comprising:
   (a) using a torque convener to cause a drive element to rotate a load element while the drive and load elements are mechanically unlocked so that the rotational speed of said drive element is greater than the rotational speed of said load element; and
   (b) using a synchronization motor connected to said load element and not to said drive element to increase the rotational speed of said load clement to thereby substantially synchronize the rotational speeds of said drive and load elements.

2. The method of claim 1; and
   (c) while the rotational speeds of said drive and load elements are substantially synchronized, mechanically locking said drive and load elements to one another.

3. The method of claim 1,
   step (b) being performed simultaneously with step (a).

4. The method of claim 1,
   step (a) including using said torque converter to increase the rotational speed of said load element.

5. The method of claim 1,
   said drive element rotating at a first substantially constant speed during steps (a) and (b).

6. A method comprising:
   (a) using a torque converter to cause a drive element to rotate a load element; and
   (b) using a motor to substantially synchronize the rotational speeds of said drive and load elements,
   said drive element rotating at a first substantially constant speed during steps (a) and (b),
   step (a) including using said torque converter to cause the rotational speed of said load element to increase from at or near zero revolutions per minute (rpm) to a second rotational speed within about 20 percent of said first substantially constant speed,
   step (b) including using said motor to increase the rotational speed of said drive element to a third rotational speed greater than said second rotational speed and within about 5 percent of said first substantially constant speed.

7. The method of claim 6,
   said first substantially constant rotational speed being at least about 1,000 rpm.

8. The method of claim 1; and
   (d) prior to step (a), rotating said drive element without rotating said load element.

9. The method of claim 1,
   step (a) including using a gas turbine to rotate said drive element.

10. The method of claim 9,
    said gas turbine being capable of producing power of at least about 2,000 horsepower at a rotational speed of at least about 1,000 rpm.

11. The method of claim 9,
    said load element being rotationally coupled to a compressor.

12. The method of claim 1,
    said torque converter being a fluid coupling.

13. A method of starting a compressor powered by a gas turbine, said method comprising:
    (a) using said gas turbine to rotate a drive shaft without rotating a load shaft that drives said compressor;
    (b) subsequent to step (a), using a torque converter to transmit torque from said drive shaft to said load shaft, thereby causing rotation of said load shaft so that the rotational speed of said toad shaft is less than the rotational speed of said drive shaft;
    (c) simultaneously with step (b), using an electric motor to increase the rotational speed of said load shaft until the rotational speeds of said drive and load shafts are substantially synchronized; and
    (d) while the rotational speeds of said drive and load shafts are substantially synchronized, mechanically locking said drive and load shafts to one another.

14. The method of claim 13,
    step (a) including increasing the rotational speed of said drive shaft from at or about zero to a first rotational speed of at least about 1,000 revolutions per minute (rpm).

15. A method of starting a compressor powered by a gas turbine, said method comprising:
    (a) using said gas turbine to rotate a drive shaft without rotating a load shaft that drives said compressor;
    (b) subsequent to step (a), using a torque converter to transmit torque from said drive shaft to said load shaft, thereby causing rotation of said load shaft;
    (c) simultaneously with step (b), using an electric motor to increase the rotational speed of said load shaft until the rotational speeds of said drive and load shafts are substantially synchronized; and
    (d) while the rotational speeds of said drive and load shafts are substantially synchronized, mechanically locking said drive and load shafts to one another,
    step (a) including increasing the rotational speed of said drive shaft from at or about zero to a first rotational speed of at least about 1,000 revolutions per minute (rpm),
    step (b) including increasing the rotational speed of said load shaft from at or about zero to a second rotational speed less than said first rotational speed but within about 10 percent of said first rotational speed.

16. The method of claim 15,
    step (c) including increasing the rotational speed of said load shaft from said second rotational speed to a third rotational speed,
    said third rotational speed being within about 5 percent of said first rotational speed.

17. The method of claim 16,
    said third rotational speed being within 1 percent of said first rotational speed.

18. The method of claim 16,
    said second rotational speed being at least about 5 rpm less than said first rotational speed,
    said third rotational speed being at least about 5 rpm greater than said second rotational speed.

19. An apparatus comprising:
    a rotational driver;
    a rotational load;
    a drive element rotatable by said driver;
    a load element for rotating said rotational load;
    a torque converter for transmitting torque from said drive element to said load element; and
    a synchronization motor drivingly connected to said load element and not to said drive element and operable to increase the speed of rotation of said load element when used in combination with said torque converter and when the load element is being rotated by the torque convener,
    said synchronization motor being unable to rotate said load element without torque being transmitted by said torque converter.

20. The apparatus of claim 19,
    said motor being a variable speed electric motor.

21. The apparatus of claim 19,
said motor having a power rating that is less than about 25 percent of the power rating of said driver at design operating conditions of said apparatus.

22. The apparatus of claim 19; and
a control system for controlling the rotational speed of said motor.

23. The apparatus of claim 22; and
a drive sensor for determining the rotational speed of said drive element; and
a load sensor for determining the rotational speed of said load element,
said control system providing for adjustment of the rotational speed of said motor based on the rotational speeds of said drive and load elements determined by said drive and load sensors.

24. The apparatus of claim 22,
said control system being operable to adjust the rotational speed of said motor until the rotational speeds of said drive and load elements are substantially the same.

25. The apparatus of claim 19; and
a mechanical locking device for selectively mechanically coupling said drive and load elements to one another.

26. The apparatus of claim 19,
said driver being a gas turbine,
said load being a compressor.

27. The apparatus of claim 19,
said apparatus being capable of operating in a first mode where said load element is decoupled from said drive element so that said drive element can be rotated without rotating said load element.

28. The apparatus of claim 19,
said apparatus being capable of operating in a second mode where said load element is coupled to said drive element by said torque converter so that rotation of said drive element causes rotation of said load element.

29. The apparatus of claim 19,
said apparatus being capable of operating in a third mode where said load element is coupled to said drive element by said torque converter and where said motor is drivingly coupled to said load element so that rotation of said load element is cooperatively powered by said driver and said motor.

30. The apparatus of claim 19,
said apparatus being capable of operating in a fourth mode where said drive and load elements are mechanically coupled to one another so that said drive and load elements rotate at exactly the same speed.

* * * * *